| (12) | United States Patent | (10) Patent No.: US 10,580,167 B1 |
|---|---|---|
| | Waggoner et al. | (45) Date of Patent: Mar. 3, 2020 |

(54) EXCLUDING MASKED REGIONS OF VIRTUAL REALITY (VR) FRAMES FROM ENCODER PROCESSING

(71) Applicant: Amazon Technologies, Inc., Seattle, WA (US)

(72) Inventors: Charles Benjamin Franklin Waggoner, Portland, OR (US); Yongjun Wu, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 15 days.

(21) Appl. No.: 15/620,690

(22) Filed: Jun. 12, 2017

Related U.S. Application Data

(63) Continuation-in-part of application No. 15/413,929, filed on Jan. 24, 2017.

(51) Int. Cl.
  *G06T 9/20*   (2006.01)
  *G06T 15/08*  (2011.01)
  *G06T 15/50*  (2011.01)
  *G06T 3/00*   (2006.01)

(52) U.S. Cl.
  CPC .............. *G06T 9/20* (2013.01); *G06T 15/08* (2013.01); *G06T 15/50* (2013.01); *G06T 3/0093* (2013.01)

(58) Field of Classification Search
  USPC ................................................. 345/427, 421
  See application file for complete search history.

(56) References Cited

U.S. PATENT DOCUMENTS

| 9,053,562  | B1 * | 6/2015  | Rabin ................... G06F 16/583 |
| 9,834,216  | B2   | 12/2017 | Pawlicki et al. |
| 2005/0078754 | A1 * | 4/2005  | Liang ..................... H04N 19/00 375/240.18 |
| 2007/0237221 | A1 * | 10/2007 | Hsu ........................ H04N 19/61 375/240.03 |
| 2007/0248164 | A1 * | 10/2007 | Zuo ...................... H04N 19/176 375/240.2 |
| 2008/0050026 | A1 * | 2/2008  | Bashyam ................ G06T 9/002 382/238 |
| 2008/0240235 | A1 * | 10/2008 | Holcomb ............. H04N 19/176 375/240.03 |
| 2010/0001997 | A1 * | 1/2010  | Kajikawa ................ G06T 17/20 345/419 |
| 2014/0132598 | A1   | 5/2014  | Narukawa |
| 2015/0228114 | A1 * | 8/2015  | Shapira ................... G06T 17/10 345/421 |
| 2016/0104318 | A1 * | 4/2016  | Allyn .................... G06F 16/164 345/419 |
| 2016/0269725 | A1 * | 9/2016  | Mrak .................... H04N 19/132 |
| 2016/0373780 | A1 * | 12/2016 | Hsu ..................... H04N 19/136 |

(Continued)

OTHER PUBLICATIONS

U.S. Appl. No. 15/413,929, filed Jan. 24, 2017, Waggoner et al.

(Continued)

*Primary Examiner* — Kimbinh T Nguyen (74) *Attorney, Agent, or Firm* — Weaver Austin Villeneuve & Sampson LLP (57) ABSTRACT

Techniques are described that enable a two-dimensional (2D) representation of three-dimensional (3D) virtual reality (VR) content to be encoded. These techniques include encoding VR content while excluding non-display pixels of the VR content from motion estimation during encoder processing.

23 Claims, 7 Drawing Sheets

(56) References Cited

U.S. PATENT DOCUMENTS

2017/0018121 A1\* 1/2017 Lawson ................ G06T 3/0093
2017/0030716 A1 2/2017 Ali et al.
2017/0185144 A1 6/2017 Li
2017/0200304 A1 7/2017 Li
2017/0374385 A1 12/2017 Huang et al.

OTHER PUBLICATIONS

U.S. Office Action dated Apr. 12, 2018 issued in U.S. Appl. No. 15/413,929.
U.S. Final Office Action dated Aug. 27, 2018 issued in U.S. Appl. No. 15/413,929.
U.S. Office Action dated Jan. 18, 2019 issued in U.S. Appl. No. 15/413,929.
U.S. Final Office Action dated May 6, 2019 issued in U.S. Appl. No. 15/413,929.

\* cited by examiner

EXCLUDING MASKED REGIONS OF VIRTUAL REALITY (VR) FRAMES FROM ENCODER PROCESSING

PRIORITY DATA

This application claims priority under 35 U.S.C. 120 to, and is a Continuation-In-Part (CIP) of U.S. application Ser. No. 15/413,929, entitled "Mirroring Edge Pixels," by Waggoner et al, filed on Jan. 24, 2017, which is incorporated herein in its entirety and for all purposes.

BACKGROUND

Virtual reality (VR) is a computer technology that replicates an environment, real or imagined, and simulates a user's physical presence in the environment and, in some cases, enables the user to interact with the environment. Typically, virtual reality content is displayed on a computer monitor or with a virtual reality device such as a virtual reality headset, which is also commonly referred to as a head-mounted display. The user may interact with the environment by interacting with the virtual reality device, through the use of a standard input device such as a keyboard or mouse, or through a multimodal device such as a wired glove. As the user interacts with the environment, three-dimensional (3D) images are provided by virtual reality software that accesses virtual reality content.

The original source images from which VR content is constructed correspond to different perspectives from the user's location within the virtual environment. In the typical work flow by which VR content is generated, these images are combined in a process known as "stitching" to form a two-dimensional (2D) representation (using, for example, polygonal or equirectangular projection) in which each of the images corresponds to a portion of a three-dimensional (3D) shape such as, for example, a cube or a cylinder. The 2D representation is then compressed using any of a variety of encoding techniques such as, for example, H.265/High Efficiency Video Coding (HEVC) or H.264/MPEG-4 Advanced Video Coding (H.264).

A 2D representation generated by a stitcher can include non-display pixels that do not contain image content. As a result, the 2D representation that is encoded can include sharp edges that separate the stitched VR content from regions of non-display pixels. During playback of the VR content, visual artifacts can result, detracting from the user's experience.

DETAILED DESCRIPTION

This disclosure describes techniques that minimize the amount of data that is encoded for non-display pixels of VR content. In addition, by excluding non-display pixels of VR content from motion estimation of encoder processing, the encoding process is expedited. Since the amount of data that is encoded and subsequently decoded is reduced, this results in an expedited decoding process and reduced memory consumption at the client device.

In addition, this disclosure describes techniques that modify non-display pixels that are immediately adjacent to display pixels within a two-dimensional (2D) representation of virtual reality (VR) content. By modifying non-display pixels, edges separating non-display pixels from display pixels are softened.

In accordance with various implementations, non-display pixels within a 2D representation of VR content are modified based, at least in part, upon display pixels within the 2D representation. More particularly, pixel values of non-display pixels that are adjacent to display pixels within the 2D representation are modified based upon pixel values of the adjacent display pixels. Where the VR content is represented by grayscale images, each pixel can be represented by a single pixel value that represents the brightness (i.e., intensity) of the pixel. In some implementations, non-display pixels are modified to replicate display pixels. In other implementations, the non-display pixels are modified to include an average pixel value of adjacent display pixels. Modification of display pixels may be performed along a vertical and/or horizontal axis.

Telecommunications networks and other content services commonly stream video to client devices for display on televisions and computer monitors. With the increase in availability of three-dimensional (3D) virtual reality content, some content services offer the streaming of 3D virtual reality content. The virtual reality content offers a user the ability to view their virtual environment from a number of viewer-selected perspectives.

To generate a 3D virtual reality environment, a virtual cube, cylinder, or other three-dimensional shape is typically used to display images of the virtual reality environment as they would be perceived by a user within the virtual reality environment. For a given user position or perspective within the virtual reality environment, there will often be 6 (or more) possible images corresponding to the faces of the three-dimensional shape. More particularly, an image may be generated and displayed for each of the faces of a virtual cube, cylinder, or other three-dimensional shape (or projection space) that would be visible from the perspective of the user within the virtual reality environment at a given point in time.

A number of polygonal projection spaces can be used to represent 3D virtual content. For example, the 3D content may be represented using a hexahedron (having 6 faces), a cube (having six faces), an octahedron (having 8 faces), a dodecahedron (having 12 faces), or an icosahedron (having 20 faces).

When images of virtual reality (VR) content corresponding to the different faces of a virtual three dimensional 3D polygonal projection space are mapped to a 2D representation such as a rectangular representation, the resulting 2D representation can include a number of non-display pixels in regions of the 2D representation that do not include 3D content. A non-display pixel is a pixel that does not contain source image content, while a display pixel is a pixel that contains source image content. For example, a non-display pixel may be represented by a set of pixel values that are each zero.

Figure 1A:
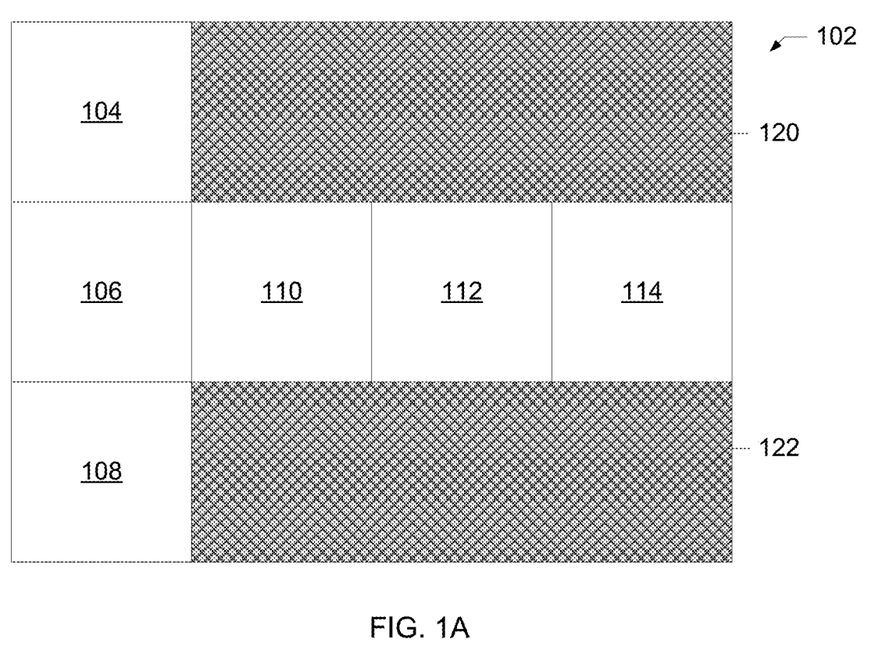
FIG. 1A illustrates an example of a 2D representation generated from 3D content that has been modeled using a polygonal projection space.

FIG. 1A illustrates an example of a 2D representation generated from 3D content that has been modeled using a polygonal projection space. In this example, 3D content modeled using a cube is mapped to a 2D representation 102. Images corresponding to the 6 faces of the cube are represented by blocks 104, 106, 108, 110, 112, and 114. Regions 120 and 122 within 2D representation 102 represent non-display pixels. In this example, each of the edges separating regions 120, 122 containing non-display pixels from regions 104, 106, 108, 110, 112, 114 containing display pixels is parallel to either a horizontal or vertical axis.

Figure 1B:
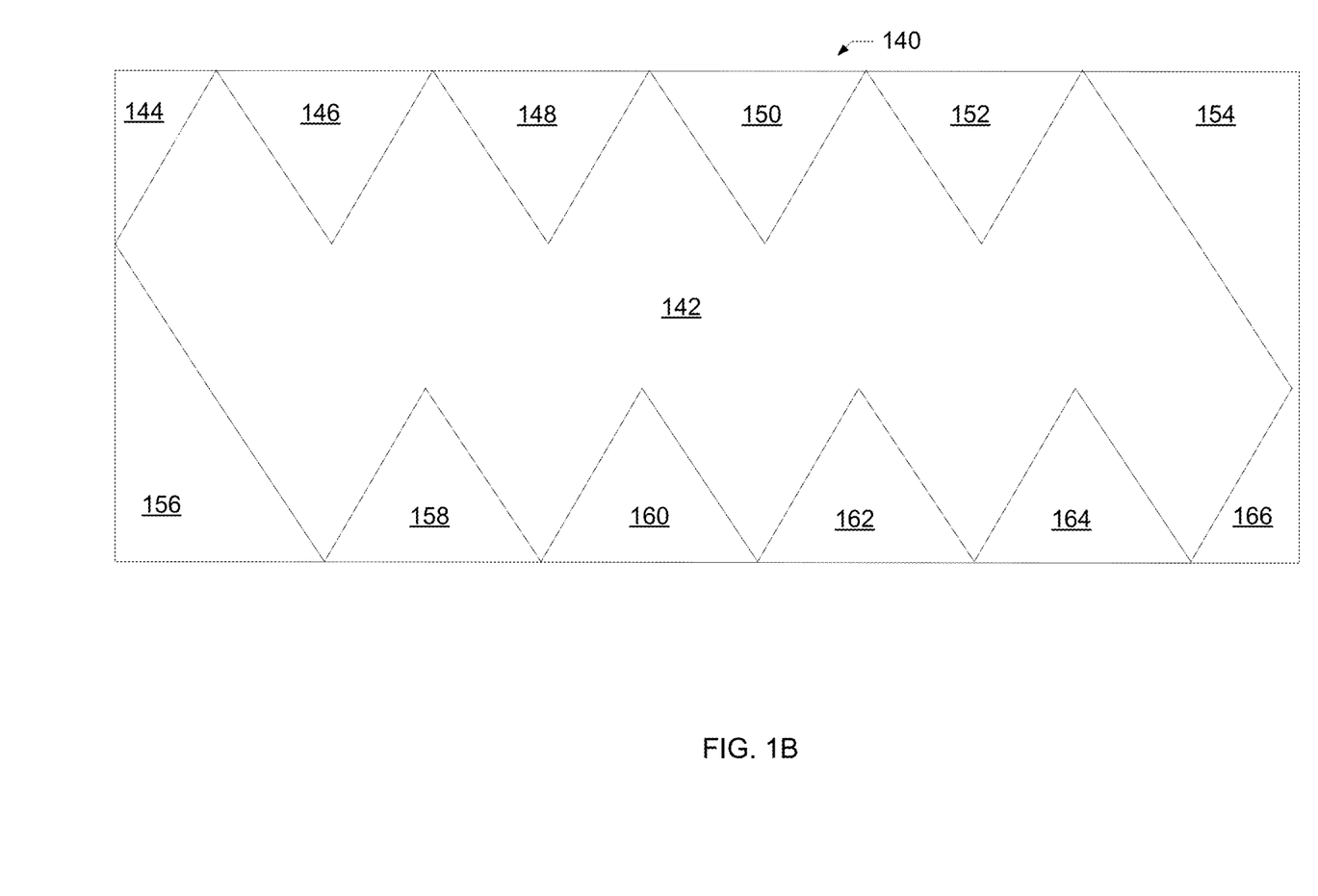
FIG. 1B illustrates another example of a 2D representation generated from 3D content that has been modeled using a polygonal projection space.

FIG. 1B illustrates another example of a 2D representation generated from 3D content that has been modeled using a polygonal projection space. In this example, representation 140 is a 2D representation of 3D content modeled using an icosahedron. Display pixels corresponding to stitched VR content are represented by region 142, while non-display pixels form remaining triangular regions 144-166 of representation 140. As shown in FIG. 1B, triangular regions 144-166 are immediately adjacent to portions of stitched VR content represented by region 142. Edges separating region 142 containing display pixels from triangular regions 144-166 containing non-display pixels are diagonal.

When a 2D representation is generated from 3D content, the 2D representation will typically include regions that contain non-display pixels. As a result, the 2D representation will typically include sharp lines at edges (e.g., borders) of stitched VR content that are immediately adjacent to non-display pixels. As shown in representations 130 and 140, region(s) containing display pixels are each separated from region(s) containing non-display pixels by a sharp edge.

The minimum block size that can be used to encode the VR content is often insufficient to separate high intensity regions from low intensity regions. Separation of high intensity regions from low intensity regions is particularly difficult when a 2D representation includes diagonal lines, as shown at 140. When a block of the VR content is encoded, the high spatial frequencies that correspond to the transition between low intensity (e.g., black) non-display pixels and adjacent high intensity (e.g., white) display pixels cannot be accurately captured. As a result, visual artifacts are likely to result along borders of the stitched VR content that abut regions of non-display pixels within the 2D representation.

During playback of virtual reality content, the 2D representation is typically scaled to a playback projection space. Pixels that do not contain visible content are typically ignored. When the edges along the borders of the stitched VR content within the 2D representation are matched up within the playback projection space, visual artifacts resulting from the encoding of the transitions between display and non-display pixels can detract from the user's experience.

Figure 2:
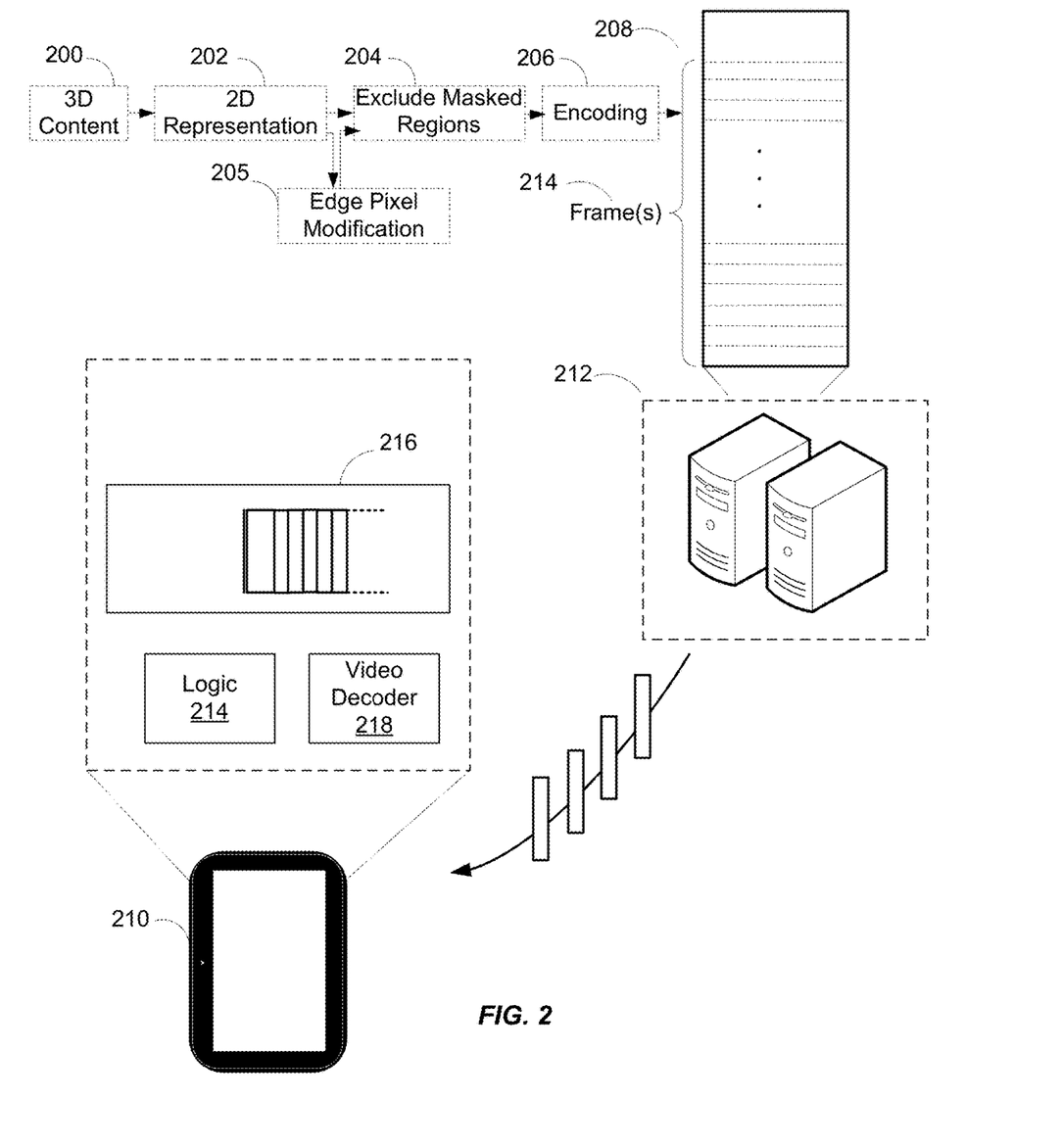
FIG. 2 illustrates an example of a particular implementation.

FIG. 2 illustrates the operation of an example of a particular implementation. 3D virtual reality content 200 including one or more images may be received or retrieved. The images all correspond to the same instant of time and correspond to the different faces of a 3D shape (or polygonal projection space).

3D virtual reality content 200 is mapped to a 2D representation 202. This is typically accomplished by a "stitcher" that stitches the images together in a 2D plane to generate the 2D representation 202. The 2D representation includes regions of display pixels and regions of non-display pixels.

In some implementations, edge pixel modification 205 is performed to soften edges between display and non-display pixels, as will be described in further detail below. More particularly, selected non-display pixels within the 2D representation may be modified based, at least in part, on adjacent display pixels within the 2D representation. Edge pixel modification can be performed by a module such as a stitcher that generates the 2D representation of the content or an independent module. Alternatively, edge pixel modification may be performed by an encoder prior to or in conjunction with encoding 206.

In accordance with various implementations, masked regions of the 2D representation are substantially excluded 204 from encoder processing. More particularly, a projection mask indicating positions of non-display pixels and display pixels within the 2D representation may be generated or obtained. In some implementations, the projection mask may be generated or updated after edge pixel modification has been performed. By applying the mask to the 2D representation, non-display pixels may be substantially excluded from the encoding process 206, as will be described in further detail below with reference to FIG. 6.

3D content corresponding to further time instants may be processed in a similar fashion. File(s) 208 storing encoded frame(s) for the 3D content 200 for corresponding time instant(s) may be stored in association with various virtual reality titles.

A user of client device 210 browses a catalogue of virtual reality titles available from service 212. When the user selects one of the titles, content service 212 streams content corresponding to the selected title to client device 210. The streaming of content to client device 210 is facilitated by software installed on client device 210. For example, the software may include virtual reality software that facilitates the rendering of virtual reality content. The software operates to provide 3D content via a display that is integrated with client device 210 (as shown) or coupled to client device 210.

Service 212 maintains files 208 associated with the titles available from service 212 that enable virtual reality content to be streamed to client devices using service 212. In this example, service 212 selects file(s) 208 that are relevant to the selected title. File 208 is a video file that includes frames 214 that have been encoded by a video encoder that operates according to a video encoding standard such as H.264 or H.265. In another implementation, virtual reality content may be generated and encoded dynamically using these or other codecs.

In one implementation, content service 212 provides information pertaining to the fragments of the virtual reality content to client device 210. For example, content service 112 may provide a manifest file that indicates locations (e.g., URLs and/or byte offsets) at which the fragments or portions thereof can be accessed. Client device 210 can use the manifest to download fragments or portions thereof. For example, client device 210 can download a fragment header including a fragment index that can be used to download frames.

Logic 214 of client device 210 may download video fragment(s) from content service 212 and store the fragment(s) in memory 216 (or buffer). Alternatively, logic 214 may selectively download individual frames that correspond to different faces of the 3D projection space from content service 212 and store the frames in memory 216.

As logic 214 selects frames for decoding, logic 214 provides the selected frames to a video decoder 218. Video decoder 218 decodes the frames to generate the corresponding digital images representing the various views of the virtual reality environment. Since a minimal amount of data associated with non-display pixels has been encoded in the frames, the video decoding process is expedited and the memory consumed by the frames is reduced. In accordance with some implementations, images that are rendered may produce fewer visual artifacts than conventional systems that do not implement pixel edge modification.

Figure 3:
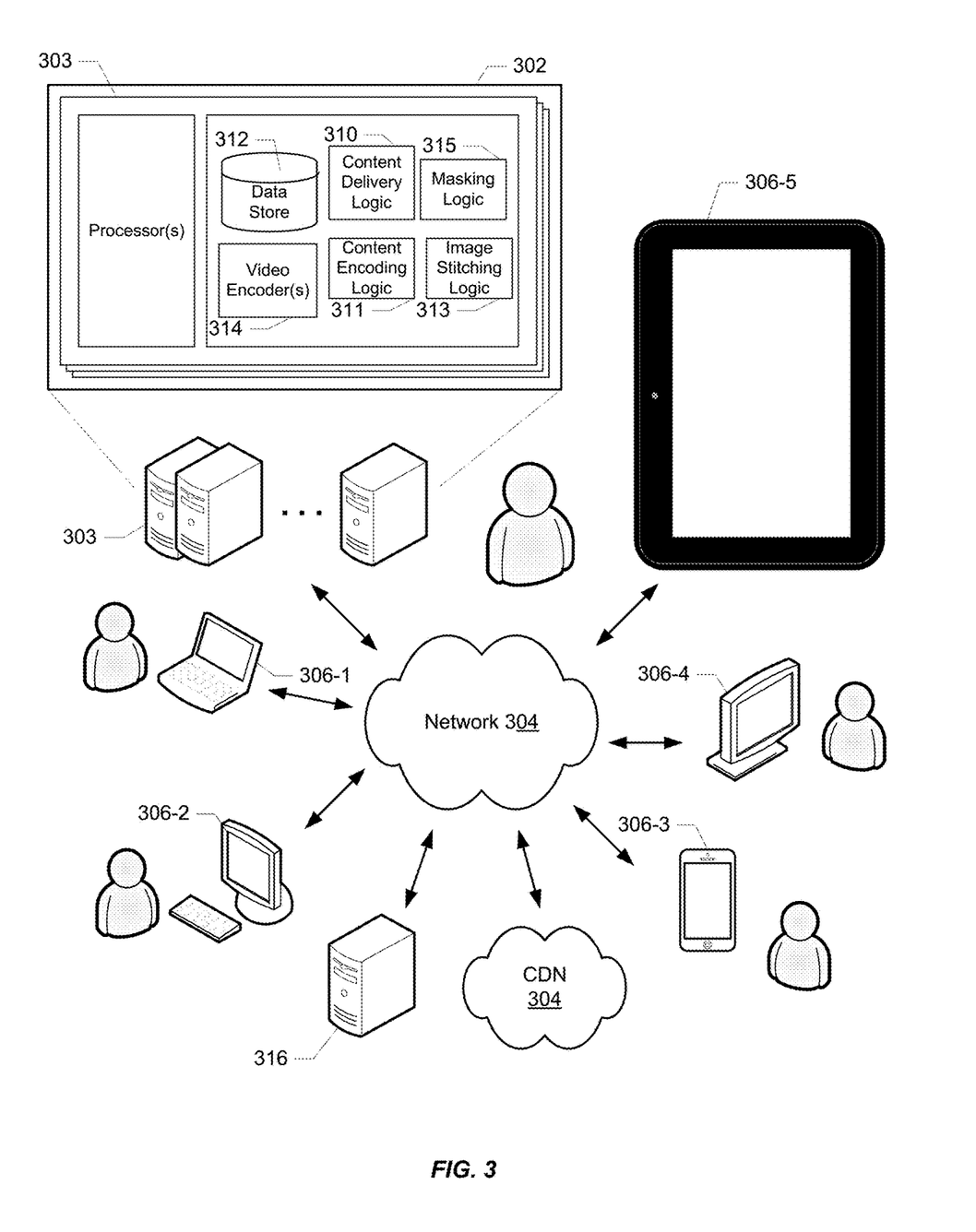
FIG. 3 is a simplified diagram of a computing environment in which various implementations may be practiced.

FIG. 3 illustrates an example of a computing environment in which a service 302 such as a content service provides virtual content via network 304 to a variety of client devices (306-1 through 306-5) in accordance with the techniques described herein. More particularly, the content may include virtual reality video-on-demand (VOD) content or broadcast content (e.g., 3D video of live events).

Content service 302 includes content delivery logic 310 which facilitates various aspects of content delivery to client devices 306. Content service 302 may conform to any of a wide variety of architectures such as, for example, a services platform deployed at one or more co-locations, each implemented with one or more servers 303. Network 304 represents any subset or combination of a wide variety of network environments including, for example, TCP/IP-based networks, telecommunications networks, wireless networks, satellite networks, cable networks, public networks, private networks, wide area networks, local area networks, the Internet, the World Wide Web, intranets, extranets, etc. Client devices 306 may be any suitable device capable of connecting to network 304 and downloading or consuming streams of VOD or broadcast content provided by service 302. Such devices may include, for example, mobile devices (e.g., cell phones, smart phones, and tablets), personal computers (e.g., laptops and desktops), set top boxes (e.g., for cable and satellite systems), smart televisions, gaming consoles, wearable computing devices (e.g., smart watches, smart glasses, or virtual reality headsets), etc.

At least some of the examples described herein contemplate implementations based on computing models that enable on-demand network access to a shared pool of computing resources (e.g., networks, servers, storage, applications, and services). As will be understood, such computing resources may be integrated with and/or under the control of the same entity controlling content service 302. Alternatively, such resources may be independent of content service 302, e.g., on a platform under control of a separate provider of computing resources with which content service 302 connects to consume computing resources as needed.

It should also be noted that, despite any references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations.

In the following examples and for the sake of simplicity, content service 302 is described as if it were integrated with the platform(s) that provides the content to client devices. However, it will be understood that content service 302 may provide access to content in conjunction with one or more content delivery networks (e.g., CDN 304) that may or may not be independent of content service 302. In addition, the source of the content may or may not be independent of content service 302 (e.g., as represented by content provider server 316).

Implementations enabled by the present disclosure contemplate logic and video decoder(s) resident on the client devices consuming content from content service 302; such logic and video decoder(s) being configured to download and decode frames of 3D video files as described herein and display the resulting images. The logic and/or decoder(s) might be part of an existing algorithm or module on the client device or implemented to work in conjunction with such an algorithm or module. The logic and/or decoder(s) might be implemented, for example, in a media player on the client device, as a browser plug-in, or as a separate application or module resident on the client device.

Implementations are also contemplated in which, in addition to content delivery logic 310 (which facilitates various aspects of content delivery to client devices 306), content service 302 includes logic that facilitates at least some aspects of the encoding of content as described herein (e.g., as represented by content encoding logic 311). In accordance with various implementations, the 2D representation is modified to eliminate or substantially reduce data representing non-display pixels prior to encoding by encoding logic 311. In some implementations, edge pixel modification is performed prior to encoding by encoding logic 311. In other implementations, edge pixel modification is not performed prior to encoding by encoding logic 311. As will be described in further detail below, encoding logic 311 may encode frames according to a specified or variable block size to reduce or minimize the number of non-display pixels in blocks that contain source image data (e.g., display pixels).

The frames associated with 3D virtual reality content may be encoded according to a particular video encoding standard or multiple encoding standards. More particularly, encoding logic 311 can employ one or more video encoders 314, where each video encoder 314 operates according to a different video encoding standard. As will be appreciated, video encoding can be implemented in software and/or hardware.

In some implementations, content service 302 also includes stitching logic 313. Stitching logic 313 may generate a 2D representation from 3D virtual content corresponding to a particular instant of time. For example, stitching logic 313 may stitch images corresponding to the faces of a 3D shape (or projection space) such that a 2D representation is generated. The 2D representation may include a grid of pixels or pixel values. Edge pixel modification may be performed by stitching logic 313, encoding logic 311, or an independent module. In some instances, stitching logic 313 or an independent module may provide metadata to facilitate edge pixel modification or encoding. For example, the metadata may identify edges within the 2D representation, indicate which display pixels are to be used to modify non-display pixels, and/or indicate non-display pixels that are to be modified.

In accordance with various implementations, masking logic 315 substantially excludes masked regions of the VR content from encoder processing. In some implementations, a 2D mask may be obtained or generated, where the mask indicates positions of non-display pixels and display pixels within the 2D representation. The mask may be generated based upon the original 2D representation. Alternatively, the mask may be generated or modified after edge pixel modification has been performed.

In some implementations, masking logic 315 modifies the 2D representation according to the mask to eliminate or substantially reduce the amount of data representing the non-visible pixels prior to providing the 2D representation to encoding logic 311. In other implementations, masking logic 315 may provide the 2D representation and the mask to encoding logic 311. Encoding logic 311 may encode the display pixels while eliminating or substantially reducing encoding of the non-display pixels.

In addition to providing access to content, content service 302 may also include a variety of information related to the content (e.g., manifests or other metadata) in data store 312 to which service 302 provides access. Alternatively, such information about the content, as well as the content itself may be provided and/or hosted by one or more separate platforms, e.g., CDN 304. It should be noted that, while logic 310, 311, and 313, video encoder 314, and data store 312 are shown as integrated with content service 302, implementations are contemplated in which some or all of these operate remotely from the associated content service, and/or are under the control of an independent entity. From these examples, those of skill in the art will understand the diversity of use cases to which the techniques described herein are applicable.

Figure 4:
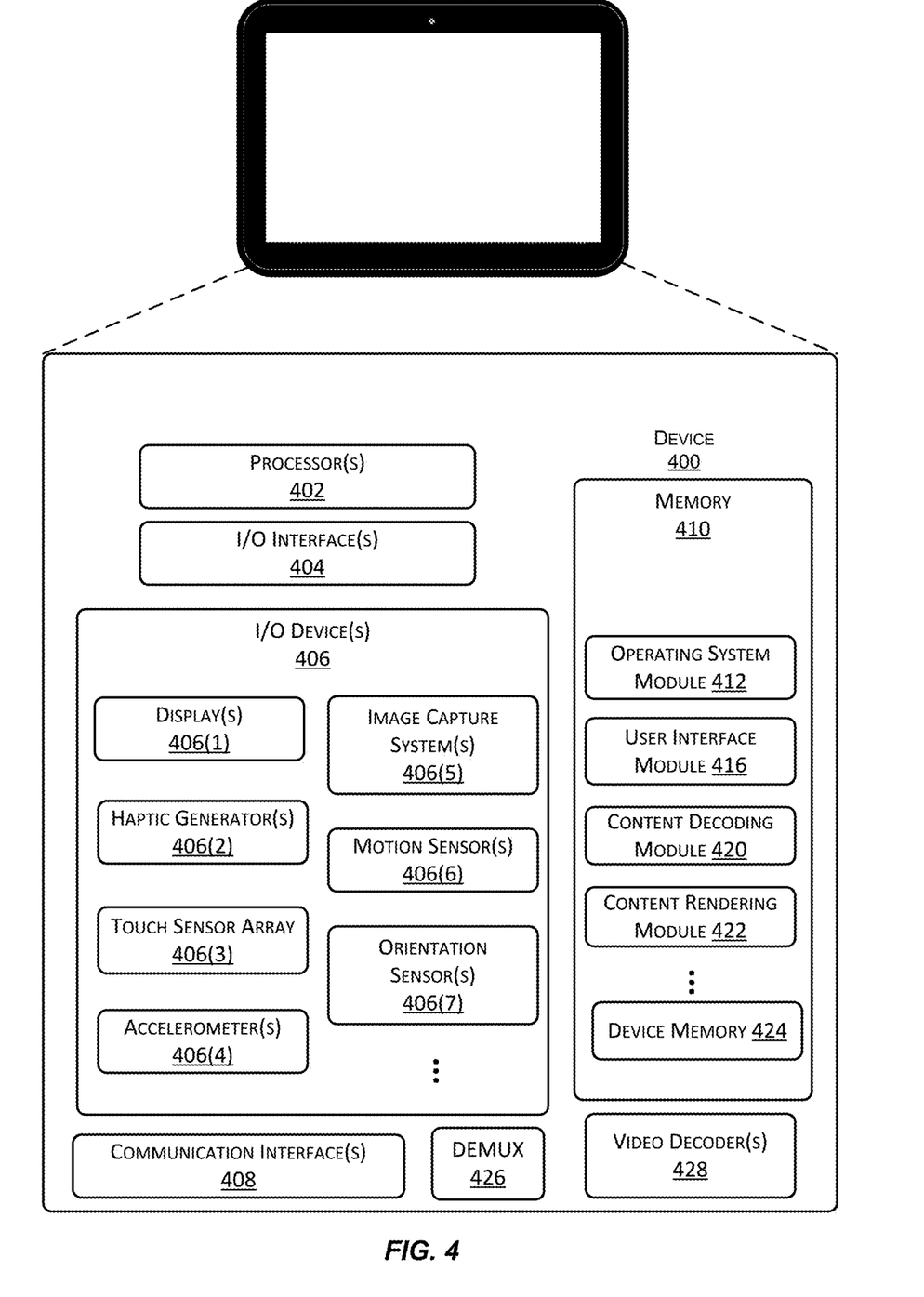
FIG. 4 is a simplified diagram of an example of a client device with which various implementations may be practiced.

A block diagram of an example of a client device 400 suitable for use with various implementations is shown in FIG. 4. Device 400 includes one or more single or multi-core processors 402 configured to execute stored instructions (e.g., in device memory 424). Device 400 may also include one or more input/output (I/O) interface(s) 404 to allow the device to communicate with other devices. I/O interfaces 404 may include, for example, an inter-integrated circuit (I2C) interface, a serial peripheral interface (SPI) bus, a universal serial bus (USB), an RS-242 interface, a media device interface, and so forth. I/O interface(s) 404 is coupled to one or more I/O devices 406. The I/O device(s) 406 may include one or more displays 406(1), one or more haptic generators 406(2), a touch sensor array 406(3), one or more accelerometers 406(4), one or more image capture systems 406(5), one or more motion sensors 406(6), one or more orientation sensors 406(7), microphones, speakers, and so forth.

User interaction with a virtual reality environment may be detected via one or more of the I/O devices 406. For example, a position or perspective of a user in relation to his or her virtual reality environment may be detected via one or more of the I/O devices 406. Based upon the current position or perspective (e.g., angle) of the user within the virtual reality environment, device 400 may decode or display portions of the virtual reality environment that are visible from the user's current position/perspective.

Device 400 may also include one or more communication interfaces 408 configured to provide communications between the device and other devices. Such communication interface(s) 408 may be used to connect to cellular networks, personal area networks (PANs), local area networks (LANs), wide area networks (WANs), and so forth. For example, communications interfaces 408 may include radio frequency modules for a 3G or 4G cellular network, a WiFi LAN and a Bluetooth PAN. Device 400 also includes one or more buses or other internal communications hardware or software (not shown) that allow for the transfer of data and instructions between the various modules and components of the device.

Device 400 also includes one or more memories (e.g., memory 410). Memory 410 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 410 provides storage for computer readable instructions, data structures, program modules and other data for the operation of device 400. As used herein, the term "module" when used in connection with software or firmware functionality may refer to code or computer program instructions that are integrated to varying degrees with the code or computer program instructions of other such "modules." The distinct nature of the different modules described and depicted herein is used for explanatory purposes and should not be used to limit the scope of this disclosure.

Memory 410 includes at least one operating system (OS) module 412 configured to manage hardware resources such as I/O interfaces 404 and provide various services to applications or modules executing on processor(s) 402. Memory 410 also includes a user interface module 416, content decoding module 420, content rendering module 422, and other modules.

Content decoding module 420 may select frames to decode and sends the selected frames to a video decoder 248. In some implementations, a demultiplexer (DEMUX) 426 may demultiplex frames of fragments and pass the demultiplexed frames to decoder 428 for decoding.

Video decoder 428 includes software and/or hardware (e.g., electrical components or a circuit) configured to decode frames of video content files according to a corresponding video encoding standard such as H.265. In accordance with various implementations, since non-display pixels have been encoded with fewer bits, video decoder 428 may decode frames using fewer processing resources and with reduced memory consumption. In accordance with various implementations, decoder 428 is agnostic to edge pixel modification that has been performed. In other implementations, decoder 428 decodes frames based, at least in part, on metadata pertaining to edge pixel modification.

Content rendering module 422 may render virtual reality content based on the decoded frames. Generally, content is rendered according to the user's position/perspective within the virtual reality environment and the timestamps of the frames. Since non-display pixels need not be decoded, content rendering module 422 may render virtual reality content more efficiently than conventional systems.

Memory 410 also includes device memory 424 to store a wide variety of instructions and information using any of a variety of formats including, for example, flat files, databases, linked lists, trees, or other data structures. Such information includes content for rendering on display 406(1) including, for example, any type of video content (e.g., frames, fragments, or video files). In some implementations, a portion of device memory 424 may be distributed across one or more other devices including servers, network attached storage devices, and so forth.

The logic or computer program instructions used to support the downloading, decoding, and rendering of virtual reality content may be implemented in a variety of ways. For example, at least some of this functionality may be implemented as part of the code of a media player operating on device 400. Alternatively, at least some of this functionality may be implemented separately from and interact with the device's media player, web browser, mobile app, decoder, etc. The range of possibilities will be understood by those of skill in the art with reference to the following description.

It will also be understood that device 400 of FIG. 4 is merely an example of a device with which various implementations enabled by the present disclosure may be practiced, and that a wide variety of other device types including, for example, virtual reality headsets may also be used. The scope of this disclosure should therefore not be limited by reference to device-specific details.

In accordance with various implementations, a 2D representation generated from source images may be modified prior to encoding the 2D representation. As will be described in further detail below, the 2D representation may be modified to eliminate or reduce data representing masked regions. In some implementations, modification of the 2D representation is performed by modifying non-display edge pixels, thereby reducing visual artifacts and improving the efficiency of the encoding process.

Figure 5:
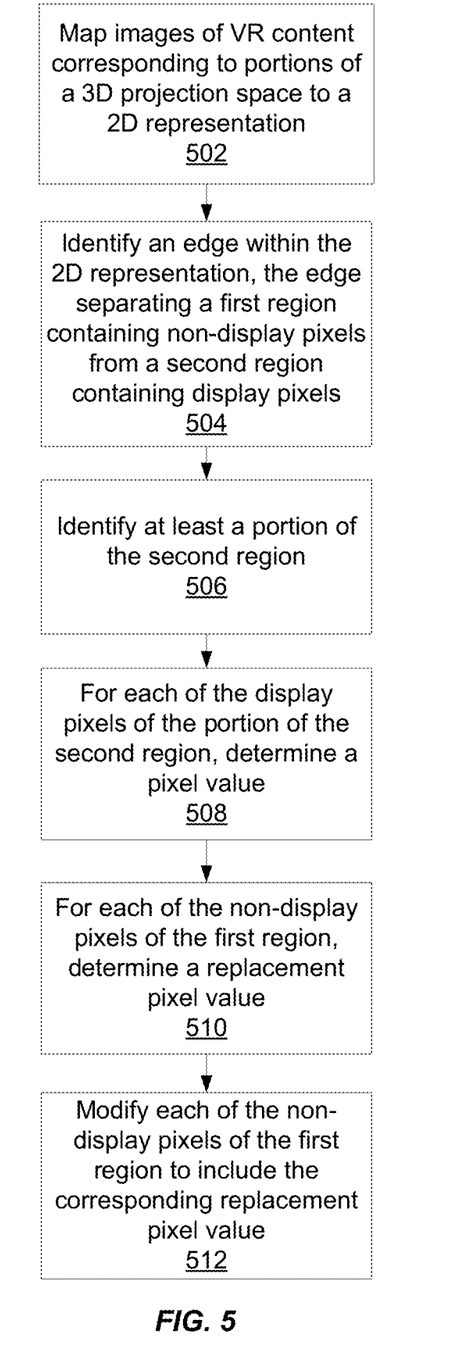
FIG. 5 is a flowchart illustrating a method of modifying edge pixels according to various implementations.

FIG. 5 is a flowchart illustrating a method of modifying edge pixels according to various implementations. Images of virtual reality (VR) content corresponding to portions (e.g., faces) of a virtual three dimensional (3D) projection space are mapped to a two dimensional (2D) representation (502). For example, the 3D projection space may include a polygonal projection space that corresponds to a hexahedron, a cube, an octahedron, a dodecahedron, or an icosahedron. The 2D representation may be a rectangular representation represented by a 2D array, where each element of the array corresponds to a different pixel After the 2D representation has been generated or otherwise obtained, edge pixel modification may be performed for each edge within the 2D representation. The process of performing edge pixel modification for a single edge is described below with reference to steps 504-512.

An edge within the 2D representation is identified (504), where the edge separates a first region containing non-display pixels from a second region containing display pixels of the VR content. The second region corresponds to a view or face of the 3D projection space, while the first region includes non-display pixels that are immediately adjacent to the second region. The edge may be identified by performing edge detection on a per-pixel basis. More particularly, edge detection may include the analysis of pixel values to ascertain points at which image brightness changes sharply. Alternatively, the edge may be identified through the use of a map of pixels that identifies edges within the 2D representation. For example, the map may identify display pixels adjacent to an edge, an image containing the display pixels adjacent to the edge, block(s) containing the display pixels adjacent to the edge, and/or non-display pixels that are adjacent to the display pixels.

At least a portion of the second region is identified for use in pixel modification (506). The portion of the second region can be identified, for example, using a map of pixels or based upon pixel analysis. The portion of the second region can include pixels immediately adjacent to the edge and/or pixels in close proximity to the edge. In some implementations, the portion of the second region includes only a subset of the display pixels within the second region. For example, the portion of the second region can consist of a block of pixels defined by an encoder.

A pixel value for each of the display pixels of the portion of the second region is identified (508). For example, a pixel value may include an intensity value. As another example, a pixel value may include color information. Color information may represent a component of a color of the pixel, such as a red component, a green component, or a blue component.

For each of the non-display pixels of the first region, a corresponding replacement pixel value is determined based, at least in part, on the pixel value of at least one of the display pixels of the portion of the second region (510). In some implementations, all of the display pixels in the second region are used for edge pixel modification. In other implementations, the display pixels of only a portion of the second region are used for edge pixel modification. For example, edge pixel modification may be performed based upon display pixels within a particular block of pixels within the second region.

Each of the non-display pixels of the first region may be modified to include the corresponding replacement pixel value (512). In some instances, the replacement pixel value will be the same for all of the non-display pixels within the first region. For example, the replacement pixel value may be the average pixel value of the display pixels within the second region or portion thereof (e.g., block of pixels). As another example, the replacement pixel value may be 0 or 1. In other instances, the replacement pixel value of a non-display pixel may replicate the pixel value of a specific display pixel. For example, the replacement pixel value for each of the non-display pixels within the first region may mirror, along a horizontal and/or vertical axis, the pixel value of a corresponding display pixel of the second region. It may be desirable, for example, to mirror pixel values of a block of display pixels. In other instances, replacement pixel values for the non-display pixels of the first region may be interpolated from the values of the display pixels within the second region. In yet other instances, replacement pixel values for the non-display pixels of the first region may be extrapolated from pixel values of the display pixels within the second region. Replacement pixel values may be extrapolated through prediction by a filter such as a sinc function.

Steps 504-512 may be repeated for each edge within the 2D representation. Edge pixel modification results in the softening of edges within the 2D representation, thereby improving coherency at the edges of the VR content. Therefore, the potential for visual artifacts at edges of the VR content is significantly reduced.

After edge pixel modification has been performed for all edges within the 2D representation, pixels corresponding to the 2D representation may be encoded. An encoder may exploit redundancies within the VR content resulting from edge pixel modification. More particularly, where the same pixel value is used for a region of non-display pixels, the encoder may more efficiently encode the pixels due to the redundancy of pixel values. Similarly, where a block of display pixel values is mirrored in a region of non-display pixels, the encoder may use the replication of the block of pixel values to more efficiently encode the 3D virtual content. Therefore, by modifying non-display pixels adjacent to the edges of the VR content, the number of bits required to encode the VR content may be reduced.

Edge pixel modification may be performed by a stitcher, an encoder, or another intermediate process. After edge pixel modification has been performed, a stitcher or other module may instruct an encoder to encode pixels including the display pixels and non-display pixels. For example, an array of pixel values or pointer thereto may be provided to the encoder. The encoder may be instructed to encode the pixels according to a variable block size or a specified block size. In addition, metadata pertaining to edge pixel modification may be provided to the encoder to facilitate the encoding process. The metadata may indicate, for example, regions containing display pixels, regions containing non-display pixels, regions containing modified pixels, etc.

In some implementations, a decoder is agnostic to the edge pixel modification process. In other implementations, a decoder receives metadata pertaining to edge pixel modification, which can be used to facilitate the decoding process.

Figure 6:
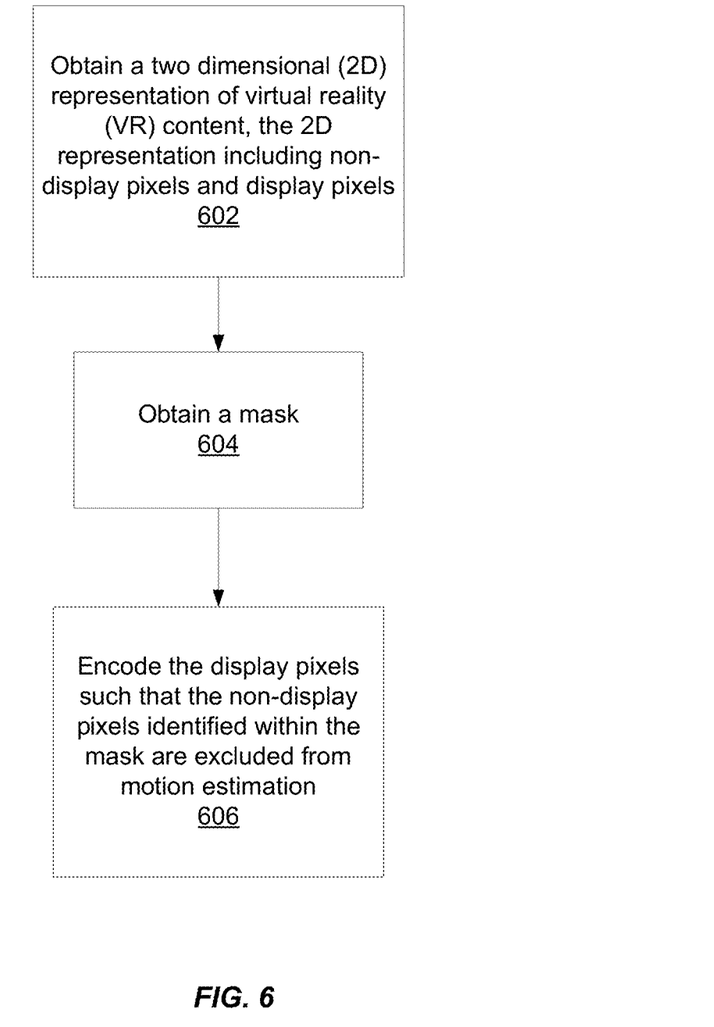
FIG. 6 is a flowchart illustrating a method of substantially excluding masked regions of VR content from encoder processing according to various implementations.

FIG. 6 is a flowchart illustrating a method of substantially excluding masked regions of VR content from encoder processing according to various implementations. A two dimensional (2D) representation of virtual reality (VR) content is obtained at 602, where the VR content includes one or more images corresponding to a plurality of portions of a virtual three dimensional (3D) projection space. More particularly, the 2D rectangular representation includes a first set of regions containing non-display pixels and a second set of regions containing display pixels, where each region of the second set of regions corresponds to a different face of the 3D projection space.

A mask indicating positions of the display pixels and the non-display pixels within the 2D representation may be obtained at 604. The mask may be represented by a data structure such as a multi-dimensional array. For example, an element of a two-dimensional array may be accessed via horizontal and vertical "coordinates" within the 2D representation, where the coordinates identify the position of a particular pixel within the 2D representation.

Each element of the mask array may store a set of values. In accordance with various implementations, the set of values may include a value that indicates whether the corresponding pixel is a display pixel or non-display pixel. For example, a value of zero may indicate that the pixel is a non-display pixel, while a value of one may indicate that the pixel is a display pixel.

An encoder may then be instructed to encode the display pixels of the second set of regions while excluding the non-display pixels from motion estimation. Instructions provided to the encoder may be explicit and/or implicit.

In accordance with various implementations, the 2D representation of the VR content is modified using the mask to exclude the masked regions and the modified 2D representation is provided to the encoder. For example, the 2D representation may be modified to eliminate or substantially reduce the information maintained for each non-display pixel. In other implementations, both the 2D representation and the mask are provided to the encoder.

In accordance with various implementations, data structure(s) representing the 2D representation or pointer(s) thereto may be provided to the encoder. In some implementations, data structure(s) representing the mask or pointer(s) thereto may also be provided to the encoder. As described above, a data structure may include a multi-dimensional array, where the indices of the array correspond to horizontal and vertical positions within the 2D representation.

An encoder may encode pixels within the 2D representation such that the non-display pixels identified within the mask are excluded from motion estimation at 606. By excluding non-display pixels from motion estimation of encoder processing, inter-prediction may be substantially reduced. In some implementations, the encoder may identify the display pixels within the 2D representation by applying the mask to the 2D representation. The encoder may modify the 2D representation by applying the mask prior to encoding.

In accordance with various implementations, the encoder may encode pixels according to a variable block size to minimize or eliminate the number of non-display pixels that are encoded in blocks that contain image data (e.g., display pixels). For example, an encoder may select an optimal block size and/or shape to encode a particular segment or region of the 2D representation. In other implementations, a smallest block size supported by a particular encoder may be used to ensure that the number of non-display pixels that are encoded within a block containing image data is minimized or eliminated. The selection of reduced block sizes is particularly advantageous where a segment of display pixels lies adjacent to a diagonal edge separating the display pixels from non-display pixels.

In accordance with various implementations, asymmetric motion partitioning (AMP) may be applied. AMP improves coding efficiency, since asymmetric, irregular shaped patterns can be more efficiently represented.

Edge pixel modification can eliminate or substantially reduce the presence of irregular shaped patterns within the 2D representation. Thus, in some implementations, AMP is applied during encoding only if edge pixel modification has not been performed.

Pixel data for non-display pixels may be encoded using a minimal number of bits. In some implementations, a DC coefficient may be encoded for a block of non-display pixels without encoding further information for the block of non-display pixels. For example, DC coefficients may be encoded for blocks of non-display pixels without encoding AC coefficients for the blocks of non-display pixels. Similarly, for mixed blocks containing both non-display and display pixels, DC coefficients may be encoded without encoding AC coefficients. In other implementations, a skip mode may be used to encode non-display pixels. More particularly, a skip encoding mode may be used to reference or copy an encoded block of non-display pixels from the current frame or a prior frame. For example, to encode a non-IDR frame, a block of a prior frame may be copied to encode a block of non-display pixels of the non-IDR frame. In yet other implementations, MPEG warping technology may be applied. More particularly, the encoder may be instructed to encode only display pixels using a warp transform.

In various implementations, supplementary data may be provided to a decoder within additional messages such as User Data Unregistered Supplementary Echo Intelligence (SEI) messages. Supplementary data may include metadata provided on a fragment or frame level. Supplementary data may include bitstream information indicating whether edge pixel modification has been performed, information identifying non-display pixels and/or display pixels, or other information to facilitate decoding by a decoder.

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:
1. A method, comprising:
obtaining a two dimensional (2D) rectangular representation of virtual reality (VR) content, the VR content including one or more images corresponding to a plurality of faces of a virtual three dimensional (3D) polygonal projection space, the virtual 3D polygonal projection space corresponding to one of a hexahedron, a cube, an octahedron, a dodecahedron, or an icosahedron, the 2D rectangular representation including a first set of regions containing a plurality of non-display pixels and a second set of regions containing a plurality of display pixels, the second set of regions including a plurality of regions, each region of the second set of regions corresponding to a different one of the plurality of faces of the 3D projection space, the display pixels containing image content of the VR content and the non-display pixels not containing image content of the VR content, each of the display pixels and non-display pixels being represented by a corresponding set of pixel values including an intensity value;

modifying the 2D rectangular representation, wherein modifying the 2D rectangular representation includes modifying the intensity value of each pixel of at least a portion of the non-display pixels of a first region of the first set of regions within the 2D rectangular representation based, at least in part, on the intensity value of at least one pixel of at least a portion of the display pixels of a second region of the second set of regions within the 2D rectangular representation, the first region being adjacent to the second region within the 2D representation;

after modifying the 2D rectangular representation, obtaining a mask indicating positions of the non-display pixels and the display pixels within the 2D representation, the mask including a first value for each of the non-display pixels and a second value for each of the display pixels; and encoding the 2D representation using the mask such that the non-display pixels of the first set of regions are excluded from motion estimation.

2. The method as recited in claim 1, wherein encoding the 2D representation comprises:
   encoding DC coefficients for the non-display pixels of the first set of regions without encoding AC coefficients for the non-display pixels of the first set of regions.

3. The method as recited in claim 1, wherein encoding the 2D representation comprises:
   encoding the non-display pixels of the first set of regions using a skip encoding mode.

4. The method as recited in claim 1, wherein encoding the 2D representation is performed according to a variable block size to minimize a total number of non-display pixels in blocks that contain display pixels.

5. The method as recited in claim 1, wherein encoding the 2D representation comprises:
   encoding only the display pixels using a warp transform.

6. A computer program product, comprising one or more non-transitory computer readable media having computer program instructions stored therein, the computer program instructions being configured such that, when executed by one or more processors, the computer program instructions cause the one or more processors to:
   obtain a two dimensional (2D) representation of virtual reality (VR) content, the VR content including one or more images corresponding to a plurality of faces of a virtual three dimensional (3D) projection space, the 2D representation including a first set of regions containing a plurality of non-display pixels and a second set of regions containing a plurality of display pixels, the second set of regions including a plurality of regions, each region of the second set of regions corresponding to a different one of the plurality of faces of the 3D projection space, the display pixels containing image content of the VR content and the non-display pixels not containing image content of the VR content;
   obtain a mask indicating positions of the non-display pixels and the display pixels within the 2D representation, the mask including a first value for each of the non-display pixels and a second value for each of the display pixels; and
   encode the 2D representation using the mask such that the non-display pixels of the first set of regions are excluded from motion estimation.

7. The computer program product as recited in claim 6, wherein the computer program instructions are further configured to cause the one or more processors to:
   encode the 2D representation using the mask by encoding DC coefficients for the non-display pixels of the first set of regions without encoding AC coefficients for the non-display pixels of the first set of regions.

8. The computer program product as recited in claim 6, wherein the computer program instructions are further configured to cause the one or more processors to:
   operate an encoder to encode the 2D representation using the mask by encoding the display pixels using Asymmetric Motion Partitioning (AMP).

9. The computer program product as recited in claim 6, wherein the computer program instructions are further configured to cause the one or more processors to:
   encode the 2D representation using the mask by encoding at least a subset of the display pixels according to a variable block size to minimize a total number of non-display pixels in blocks that contain display pixels.

10. The computer program product as recited in claim 6, wherein the computer program instructions are further configured to cause the one or more processors to:
    instruct an encoder to encode a subset of the display pixels according to a specified block size.

11. The computer program product as recited in claim 6, wherein encoding the 2D representation comprises:
    encoding the non-display pixels of the first set of regions using a skip encoding mode.

12. The computer program product as recited in claim 6, wherein the computer program instructions are further configured to cause the one or more processors to:
    identify an edge within the 2D representation, the edge separating a first region of the first set of regions from a second region of the second set of regions;
    identify at least a portion of the second region;
    determine an intensity value for each of the display pixels of the portion of the second region;
    for each of the non-display pixels of a portion of the first region, determine a corresponding replacement intensity value based, at least in part, on the intensity value of at least one of the display pixels of the portion of the second region;
    modify each of the non-display pixels of the portion of the first region to include the corresponding replacement intensity value; and
    generate or update the mask according to a result of modifying each of the non-display pixels of the portion of the first region to include the corresponding replacement intensity value.

13. The computer program product as recited in claim 12, wherein the replacement intensity value for each of the non-display pixels of the portion of the first region comprises:

the intensity value of a corresponding display pixel of the portion of the second region; or an average intensity value of the display pixels of the portion of the second region.

14. A system, comprising:
an encoder configured to encode video frames according to a particular encoding standard; and
one or more processors and memory configured to:
obtain a two dimensional (2D) representation of virtual reality (VR) content, the VR content including one or more images corresponding to a plurality of faces of a virtual three dimensional (3D) projection space, the 2D representation including a first set of regions containing a plurality of non-display pixels and a second set of regions containing a plurality of display pixels, the second set of regions including a plurality of regions, each region of the second set of regions corresponding to a different one of the plurality of faces of the 3D projection space, the display pixels containing image content of the VR content and the non-display pixels not containing image content of the VR content;
obtain a mask indicating positions of the non-display pixels and the display pixels within the 2D representation, the mask including a first value for each of the non-display pixels and a second value for each of the display pixels; and
encode the 2D representation using the mask such that the non-display pixels of the first set of regions are excluded from motion estimation.

15. The system as recited in claim 14, the one or more processors and memory being further configured to:
encode the 2D representation by encoding DC coefficients for the non-display pixels of the first set of regions without encoding AC coefficients for the non-display pixels of the first set of regions.

16. The system as recited in claim 14, the one or more processors and memory being further configured to:
encode the 2D representation such that a skip encoding mode is used to encode the non-display pixels of the first set of regions.

17. The system as recited in claim 14, the one or more processors and memory being further configured to:
operate an encoder to encode the 2D representation by encoding the display pixels using Asymmetric Motion Partitioning (AMP).

18. The system as recited in claim 14, the one or more processors and memory being further configured to:
encode the 2D representation by encoding at least a subset of the display pixels according to a variable block size to minimize a total number of non-display pixels in blocks that contain display pixels.

19. The system as recited in claim 14, the one or more processors and memory being further configured to:
identify an edge within the 2D representation, the edge separating a first region of the first set of regions from a second region of the second set of regions;
identify at least a portion of the second region;
determine an intensity value for each of the display pixels of the portion of the second region;
for each of the non-display pixels of a portion of the first region, determine a corresponding replacement intensity value based, at least in part, on the intensity value of at least one of the display pixels of the portion of the second region;
modify each of the non-display pixels of the portion of the first region to include the corresponding replacement intensity value; and
generate or update the mask according to a result of modifying each of the non-display pixels of the portion of the first region to include the corresponding replacement intensity value.

20. The system as recited in claim 19, wherein the replacement intensity value for each of the non-display pixels of the portion of the first region comprises:
the intensity value of a corresponding display pixel of the portion of the second region; or
an average intensity value of the display pixels of the portion of the second region.

21. The method as recited in claim 1, further comprising:
generating the 2D rectangular representation of the VR content by mapping the images of VR content corresponding to the plurality of faces of the virtual three dimensional (3D) polygonal projection space to the 2D projection space.

22. The method as recited in claim 1, the first value being a first one of two different binary values and the second value being a second one of the two different binary values.

23. The method as recited in claim 1, the first value being zero and the second value being one.

* * * * *